United States Patent [19]

Cozad

[11] Patent Number: 4,644,895
[45] Date of Patent: Feb. 24, 1987

[54] MARKING ARRANGEMENT FOR AIDING AIRCRAFT MID-AIR REFUELING

[75] Inventor: C. Paul Cozad, Kenmore, N.Y.

[73] Assignee: Scipar, Inc., Williamsville, N.Y.

[21] Appl. No.: 703,028

[22] Filed: Feb. 19, 1985

[51] Int. Cl.[4] ............................................. G01D 11/00
[52] U.S. Cl. ...................................... 116/200; 116/209
[58] Field of Search .................. 283/1 R; 244/135 A, 244/87, 88, 89, 90 R; 116/200, 209, DIG. 43

[56] References Cited

U.S. PATENT DOCUMENTS

| | | | |
|---|---|---|---|
| 3,067,972 | 12/1962 | Mosher | 244/135 A |
| 3,711,826 | 1/1973 | LaRussa | 340/27 NA |
| 3,776,574 | 12/1973 | Henderson | 283/1 R |
| 4,095,761 | 6/1978 | Anderson | 244/135 A |
| 4,288,845 | 9/1981 | Finsness | 244/135 A |
| 4,298,176 | 11/1981 | Kendall | 244/135 A |
| 4,380,788 | 4/1983 | Korski | 244/135 A |
| 4,398,685 | 8/1983 | Task et al. | 244/135 A |

OTHER PUBLICATIONS

McDonnell Douglas Corporation publication dated 9/79—2 pages.

Primary Examiner—Charles Frankfort
Assistant Examiner—Denis E. Corr
Attorney, Agent, or Firm—Joseph P. Gastel

[57] ABSTRACT

A visual enhancement marking arrangement for a receiver aircraft having a body portion and a fuel receiving receptacle on the body portion for receiving the outer end of a refueling boom of a tanker aircraft, the marking arrangement increasing visual and depth perception of an observer in a tanker aircraft and including inner converging runway lines converging toward the fuel receiving receptacle, outer converging runway lines substantially parallel to the inner converging runway lines, substantially parallel comparator lines between the inner converging runway lines spaced apart about the width of the fuel receiving receptacle and in alignment therewith, milestone marker lines perpendicular to the comparator lines and extending between the inner runway lines, gradient density contour lines located on opposite sides of the fuel receiving receptacle, fuel receptacle outline markings, stabilizer vane markings, and danger marking lines delineating critical "do not contact" areas including windscreen outline markings and radar dome outline markings.

40 Claims, 17 Drawing Figures

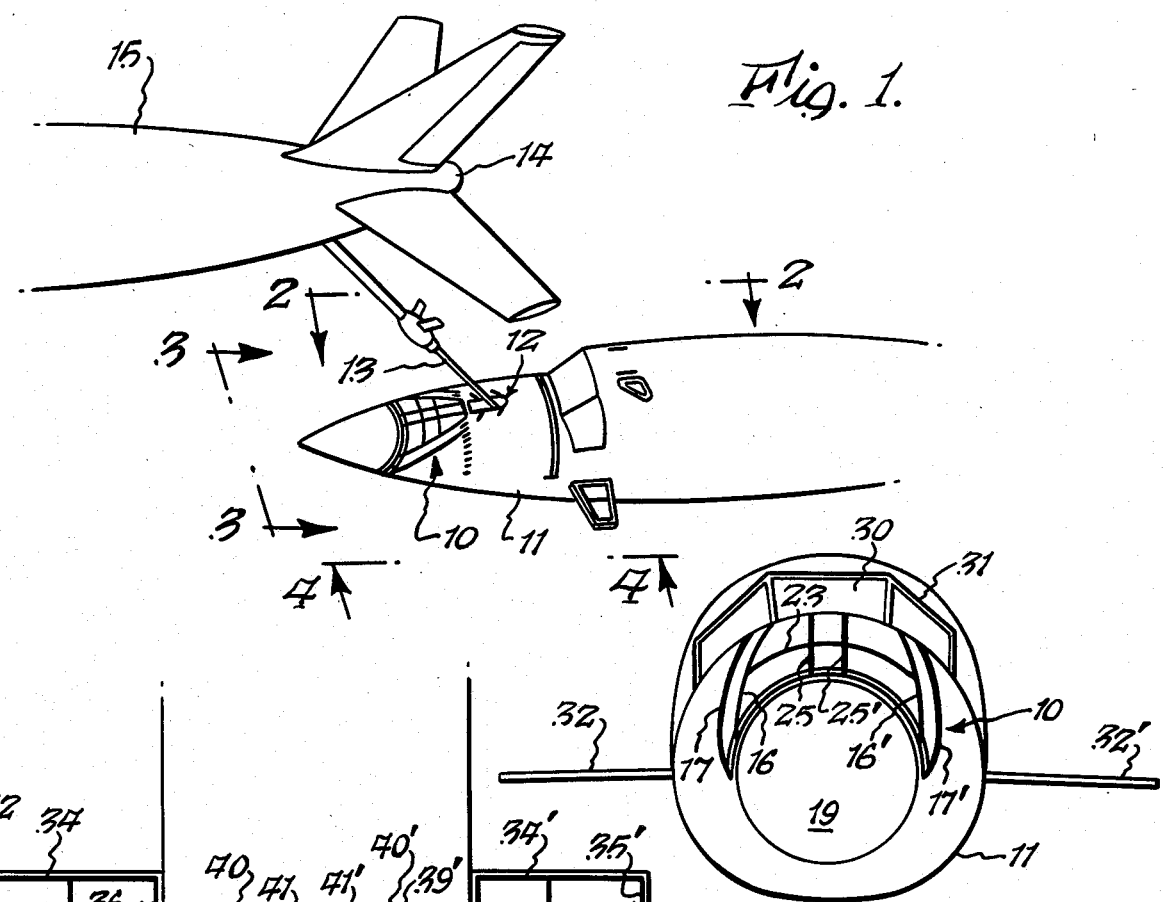

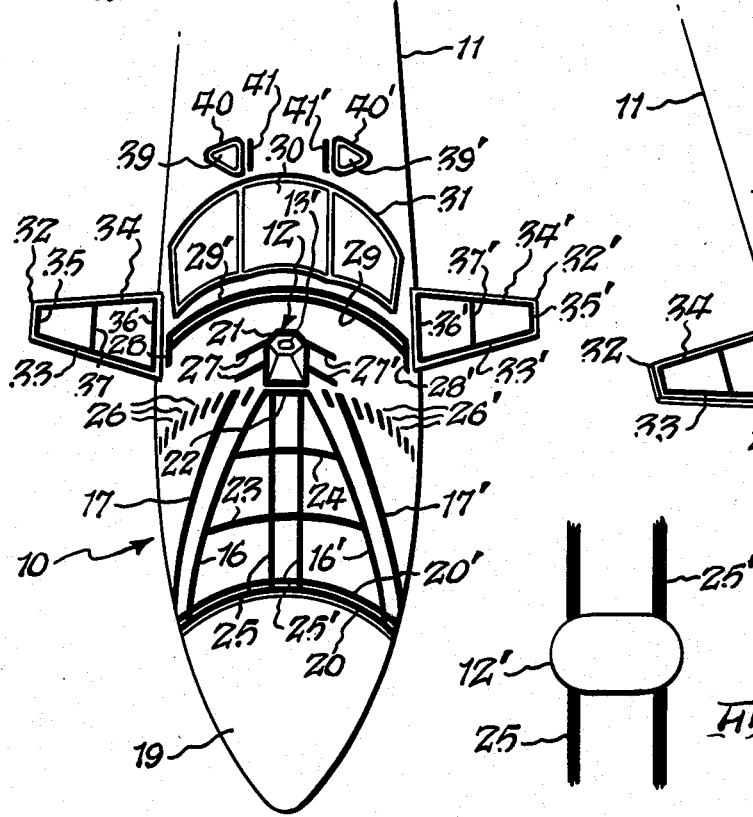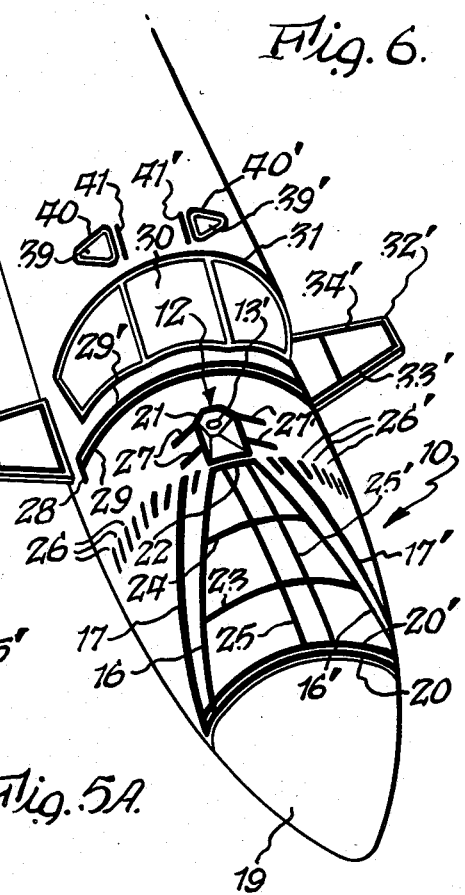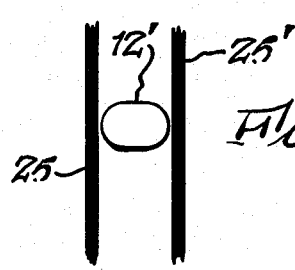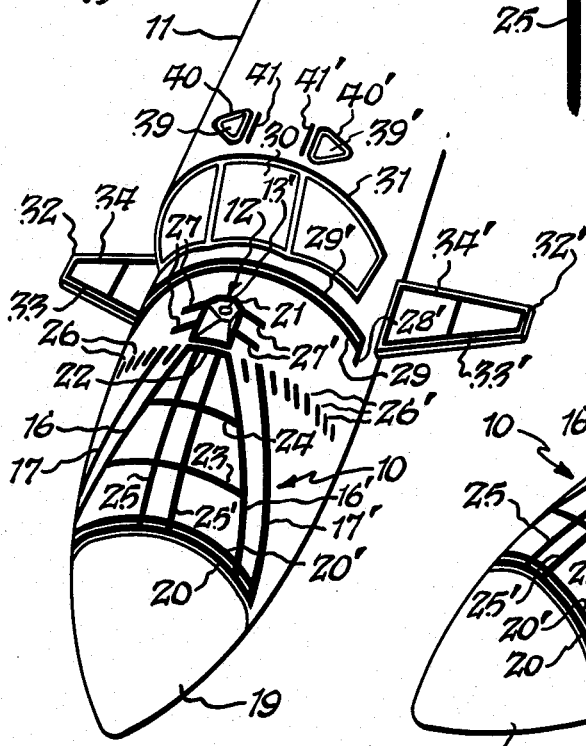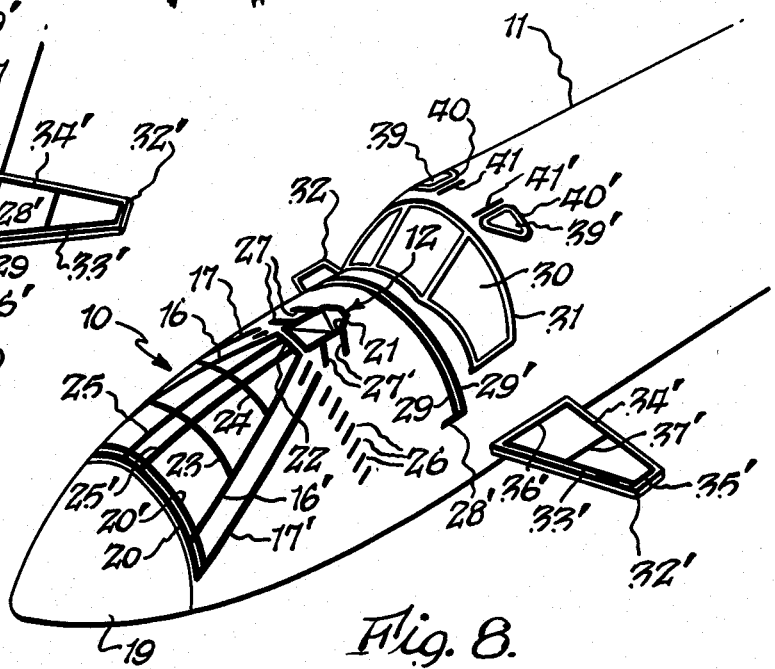

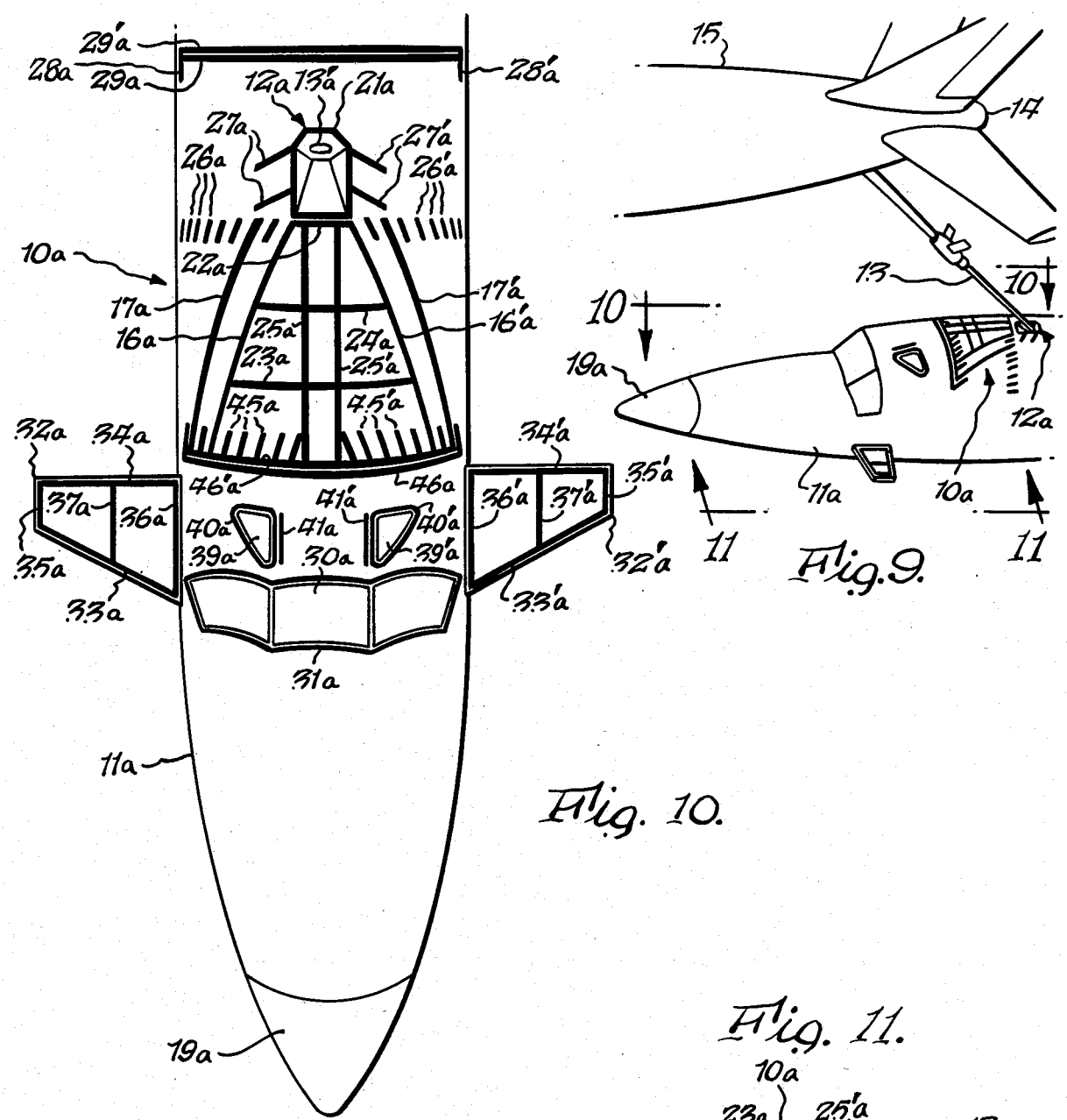
Fig. 9.
Fig. 10.
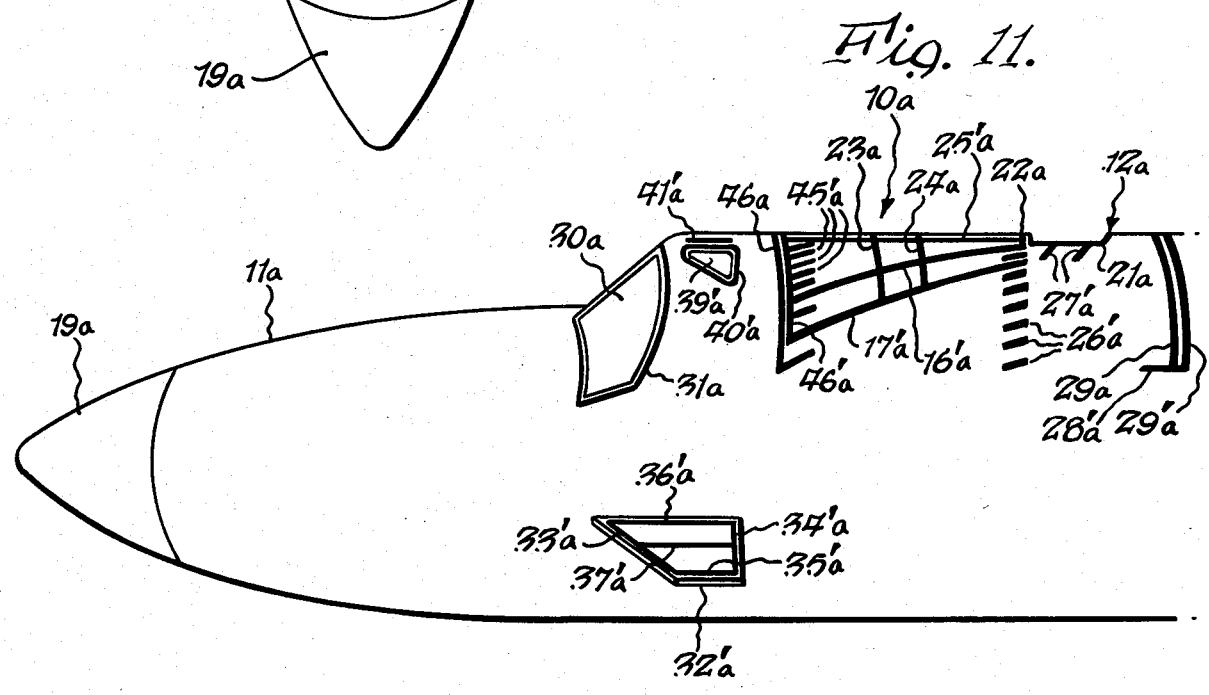
Fig. 11.

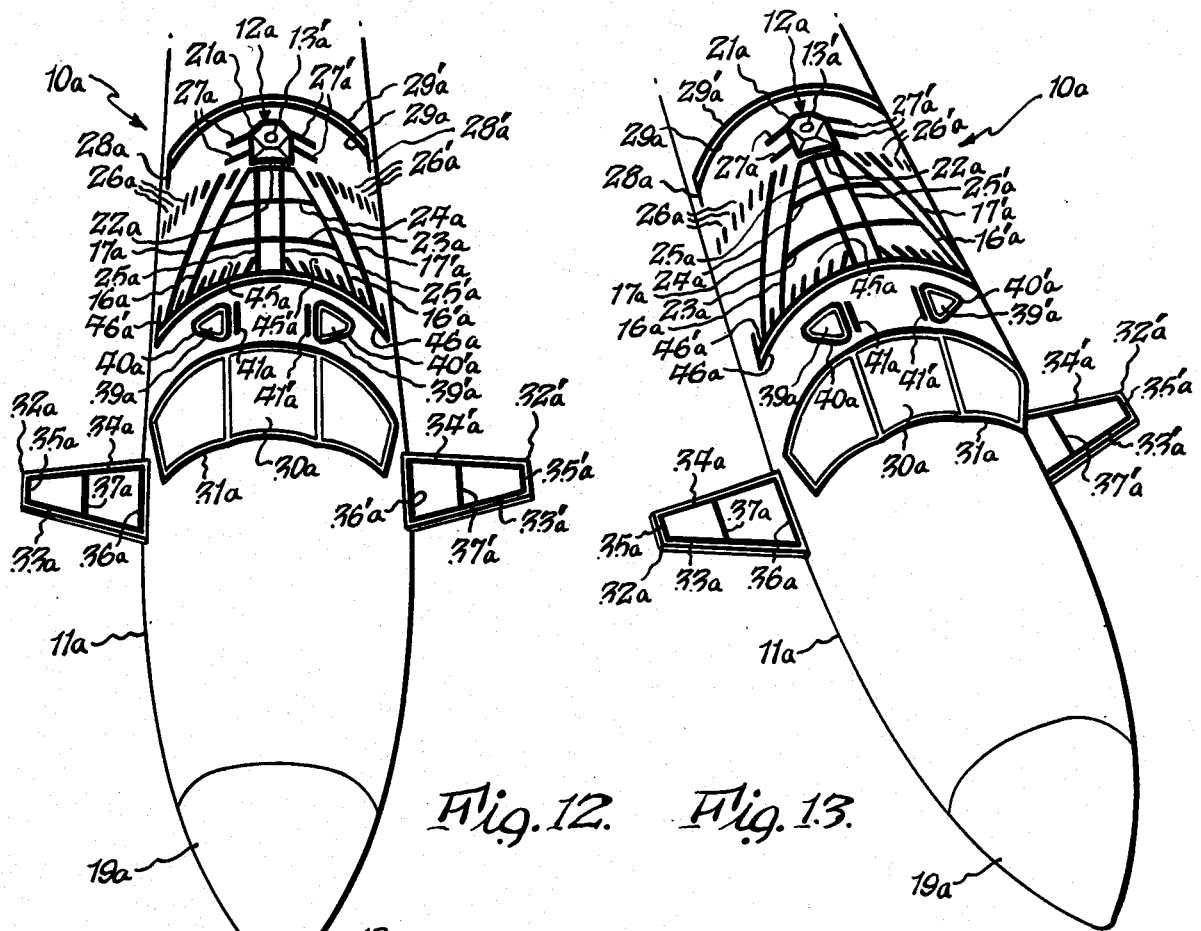
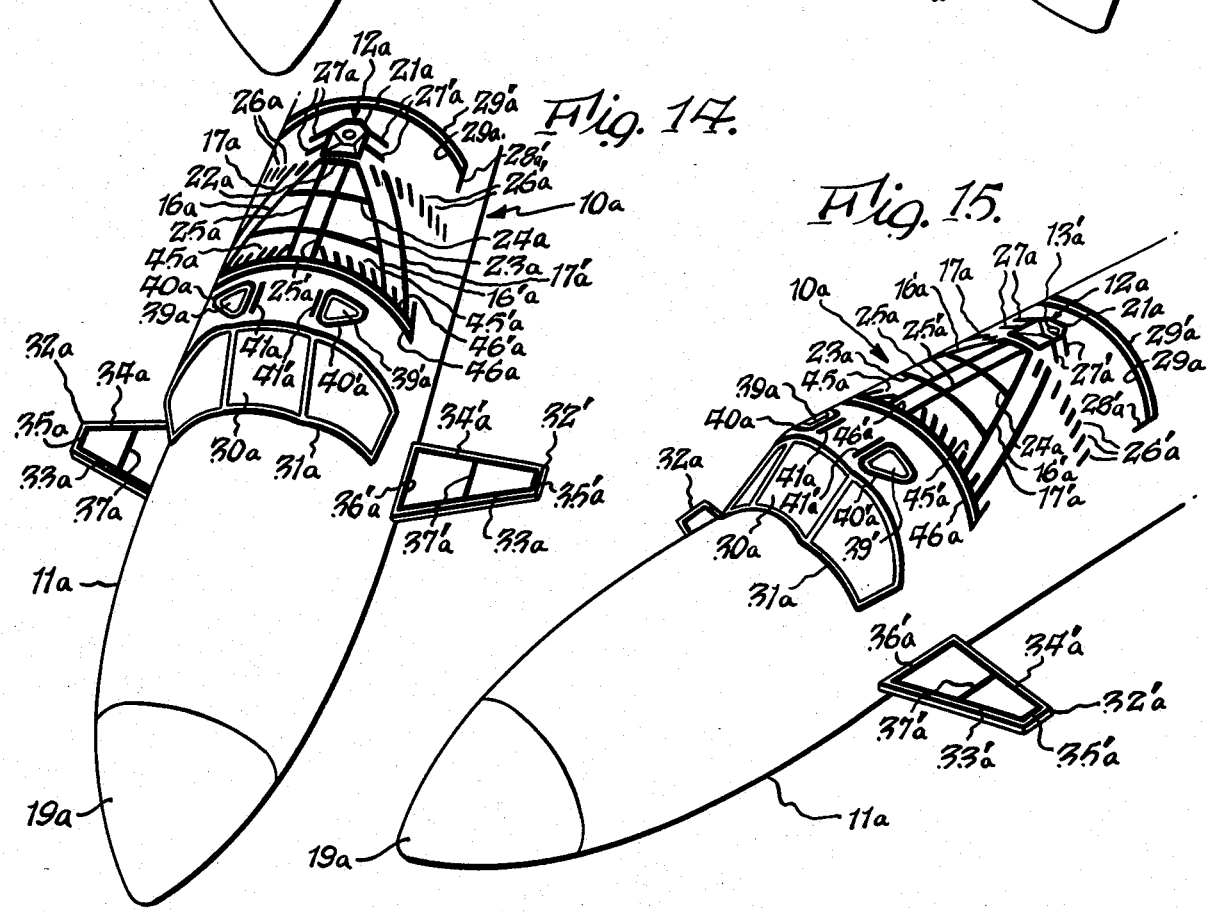
Fig. 12.   Fig. 13.   Fig. 14.   Fig. 15.

MARKING ARRANGEMENT FOR AIDING AIRCRAFT MID-AIR REFUELING

BACKGROUND OF THE INVENTION

The present invention relates to a marking arrangement on a receiver aircraft for enhancing the visual and depth perception of a boom operator in a tanker or other aircraft during a mid-air refueling operation or other aircraft to aircraft operations.

By way of background, the risks and error rates for mid-air refueling and other operations are dramatically increased by homogenous non-reflective darker colors on the receiver aircraft and/or adverse light conditions, such as occur at night, at dusk, or in clouds. Operators engaged in these tasks can experience higher rates of misalignments and misjudgments when under stress or when lighting and viewing conditions are less than optimal. The resulting errors can have disastrous consequences, particularly if the fuel boom strikes the windscreen or other critical areas of the receiver aircraft.

By way of further background, it is known to mark portions of a receiver aircraft to aid in the insertion of the fuel boom of a tanker aircraft into the fuel receiving receptacle of the receiver aircraft. The present invention is an improvement over the prior marking arrangement.

SUMMARY OF THE INVENTION

It is the basic object of the present invention to provide a marking arrangement on a first aircraft for enhancing visual and depth perception of an operator on a second aircraft engaged in a mid-air operation with the first aircraft.

It is another object of the present invention to provide an improved visual enhancement marking arrangement on a receiver aircraft which enhances visual and depth perception, thus increasing the 3-D effect of the refueling area of a receiver aircraft to visually aid a boom operator of a tanker aircraft by presenting critical visual and depth cues on the receiver aircraft for judgment in alignment and eventual insertion of the end of the fuel boom into a fuel receiving receptacle.

It is a further object of the present invention to provide a marking arrangement on a receiver aircraft which include features which (1) aid in gauging the distance between the end of the fuel boom and the surface of the receiver aircraft, and (2) aid in aligning the fuel boom with the receiver aircraft, and (3) aid in guiding the end of the fuel boom toward the fuel receiving receptacle, and (4) aid in preventing the boom operator from moving the fuel boom too close to critical aircraft areas, such as the windshield or radar dome, and (5) aid in defining the contour of the receiver aircraft by presenting visual and depth perception cues to facilitate fuel boom insertion, and (6) aid in mid-air refueling under adverse light or other viewing conditions, and (7) aid in initial alignment of receiver aircraft with tanker aircraft. Other objects and attendant advantages of the present invention will readily be perceived hereafter.

The present invention relates to a marking arrangement for a receiver aircraft having a convex body portion with a longitudinal axis and a fuel receiving receptacle on said convex body portion for receiving the outer end of a refueling boom of a tanker aircraft, the marking arrangement being located on the convex body portion for aiding in the alignment of said outer end of said refueling boom with said fuel receiving receptacle comprising converging runway line means converging toward said fuel receiving receptacle for aiding in the guidance of said outer end of said fuel boom toward said fuel receiving receptacle, and spaced comparator line means centrally located between said conveying runway line means leading toward said fuel receiving receptacle for aiding in the judging of the distance of said outer end of said fuel boom from said convex body portion of said receiver aircraft. The various aspects of the present invention will be more fully understood when the following portions of the specification are read in conjunction with the accompanying drawings wherein:

BRIEF DESCRIPTION OF THE DRAWINGS

FIG. 1 is a fragmentary perspective view of a tanker aircraft having a fuel boom inserted into the fuel receiving receptacle on the nose area of a receiver aircraft;

FIG. 2 is a fragmentary plan view of the nose area of the receiver aircraft with the improved marking arrangement of the present invention thereon;

FIG. 3 is a front elevational view of the aircraft of FIG. 2;

FIG. 4 is a side elevational view of the aircraft of FIG. 2;

FIG. 5 is a fragmentary view of the nose area of the receiver aircraft when viewed from the tail of the tanker aircraft oriented in a position which is above, ahead and directly in line with the receiver aircraft and showing how the marking arrangement is seen by the boom operator in the tail of the tanker aircraft;

FIG. 5A is a fragmentary schematic view showing how the end of the fuel boom looks in size to the boom operator when it is relatively far from the comparator lines on the receiver aircraft;

FIG. 5B is a view similar to FIG. 5A but showing how the bulge end of the fuel boom looks in size when it is relatively near the comparator lines of the receiver aircraft;

FIG. 6 is a view taken from the tail of the tanker aircraft which is above, ahead, and to the left of the receiver aircraft and showing how the marking arrangement is seen by the boom operator in the tail of the tanker aircraft;

FIG. 7 is a view taken from the tail of the tanker aircraft which is above, ahead, and to the right of the receiver aircraft and showing how the marking arrangement is seen by the boom operator in the tail of the tanker aircraft;

FIG. 8 is a view similar to FIG. 7 but showing how the markings on the receiver aircraft are viewed by the boom operator when the tanker aircraft is more to the right of the receiver aircraft than in FIG. 7;

FIG. 9 is a fragmentary perspective view showing the fuel boom of a tanker aircraft in a fuel receiving receptacle of a receiver aircraft located between the windshield and the tail of the receiver aircraft and showing a marking arrangement substantially similar to the marking arrangement of FIGS. 1-8;

FIG. 10 is a plan view of the receiver aircraft of FIG. 9 having the improved marking arrangement of the present invention thereon, and showing additional gradient density lines in the front area of the marking arrangement;

FIG. 11 is a side elevational view of the receiver aircraft of FIG. 10;

FIG. 12 is a view taken from the tail of a tanker aircraft above, ahead, and in line with the receiver aircraft of FIG. 10 and showing how the marking arrangement is seen by the boom operator in the tail of the tanker aircraft;

FIG. 13 is a view taken from the tail of the tanker aircraft which is above, ahead, and to the left of the receiver aircraft of FIG. 10 and showing how the marking arrangement is seen by the boom operator in the tail of the tanker aircraft;

FIG. 14 is a view similar to FIG. 13 but showing how the marking arrangement is seen by the boom operator when the tanker aircraft is above, ahead, and to the right of the receiver aircraft; and FIG. 15 is a view similar to FIG. 14 but showing how the marking arrangement is seen by the boom operator when the tanker aircraft is more to the right of the receiver aircraft than in FIG. 14.

DESCRIPTION OF THE PREFERRED EMBODIMENTS

In FIG. 1 the improved markings 10 of the present invention are shown on the nose portion of receiver aircraft 11 which has a fuel receiving receptacle 12 which has received a fuel boom 13 carried by the tail portion 14 of a tanker aircraft 15.

The marking arrangement 10 is for the purpose of enhancing the boom operator's visual and depth perception to thereby facilitate his judgment of distance and sufficient 3-D properties of a receiver aircraft refueling area for accurately maneuvering the fuel boom 13 toward the fuel receiving receptacle 12 and final insertion of the end of the fuel boom 13 into the fuel valve 13' located at the aft end of fuel receiving receptacle 12. The marking arrangement is especially desirable under low light and adverse viewing conditions and conditions of boom operator stress or fatigue. It is to be noted that this marking system can be of a passive nature, in that there is no requirement for an electrical or other interface with other systems of the receiver aircraft; or of an active nature, in that electrical or other interface is required to illuminate or enhance the markings; or of a partially active nature, combining elements of a passive and active marking system. As will become more readily apparent hereafter, all that is required for the passive system during nighttime refueling is sufficient light on the tanker aircraft controlled to the desired illumination by the boom operator and directed at the markings on the receiver aircraft.

The marking arrangement 10 of the present invention is a symmetrical design relative to the longitudinal axis of the aircraft, and it includes inner converting runway lines 16 and 16' and outer converging runway lines 17 and 17' which are parallel to inner lines 16 and 16', respectively. Lines 16, 16', 17 and 17' start aft of the nose area such as a radar dome 19 which is delineated by a double line 20, 20'. Runway lines 16, 16', 17 and 17' start at line 20 and converge toward the fuel receiving receptacle 12 which is outlined by a line 21 and slant lines 27 and 27'. Inner runway lines 16 and 16' terminate at line 22. Line 22 is of a length which is about equal to the width of the fuel receiving receptacle 12. Lines 16 and 16' are spaced apart the length of line 22 at the fuel receiving receptacle 12. Lines 16, 16', 17 and 17' are continuous throughout their entire length. Preferably lines 16 and 16' are an inch wide and lines 17 and 17' are 1½ inches wide for a nominal 50-foot viewing range, but either can be narrower or broader, in accordance with desired viewing range.

The function of lines 16, 16', 17 and 17' is to visually facilitate the guidance of the outer end of fuel boom 13 by the boom operator on the tanker aircraft into the fuel receiving receptacle 12. Lines 16 and 16' are the main converging lines for this marking system; lines 17 and 17' further aid in alignment and also enhance the perspective and shape of a contoured surface. The boom operator locates the outer end of the fuel boom between the more spaced apart portion of lines 16 and 16' and gradually guides the fuel boom between these lines until it enters fuel receptacle 12. The converging nature of lines 16 and 16' toward fuel receptacle 12 aids the boom operator in visually guiding the end of the fuel boom during the normal random oscillation of the receiver aircraft. This converting lines system is significantly more accurate than if the boom operator attempted to maintain the end of the fuel boom in alignment with or over a single line which was directly aligned with the fuel receptacle 12. In other words, lines 16, 16', 17, and 17' function in the nature of a visual funnel which facilitates the natural tendency of the boom operator to refine the initially gross alignment movements to the more cautious, slower, and discrete finer fuel boom movement as the actual fuel receiving receptacle is approached. Lines 16, 16', 17 and 17' can be continuous or can be slightly broken but substantially continuous to enhance the converging effect.

As noted previously, the forward portion of the receiver aircraft 11 is convex, as can be seen from FIG. 3. Therefore, when the boom operator in the tanker aircraft is directly in line with and above the receiver aircraft as shown in FIG. 5, the spacing between lines 16 and 17 will appear to him to be the same as the spacing between lines 16' and 17'. This will be an indication to him that the tanker aircraft and the receiver aircraft are aligned. However, as can be seen from a comparison of FIG. 5 with FIGS. 6, 7 and 8, when the receiver aircraft and the tanker aircraft are not in alignment, the spacing between lines 16 and 17 will be different than the spacing between lines 16' and 17'. This will indicate to the boom operator that the tanker aircraft should move toward whichever pair of lines 16–17 or 16'–17' which appear to be spaced closer to each other than the other pair of lines. The foregoing appearance of difference in spacing between respective pairs of lines occurs because the runway lines 16, 16', 17 and 17' are located on the convex surface of the aircraft. This is in keeping with the natural visual depth and alignment cues to which a viewer has become subconsciously conditioned under normal viewing of contoured objects having varying types of surface context and markings.

In addition to the foregoing, milestone crossbar lines 20, 20', 23, 24, and 22 extend between runway lines 16 and 16', as shown. These lines are parallel, equally spaced, and are of a sufficient determined length to show the convex nose contour of the aircraft at each location, as viewed from the boom operator's refueling position. This can be seen from a comparison of FIG. 2 with FIG. 5. This gives the boom operator an important perceptual depth cue in the form of a 3-dimensional contour display view. The milestone crossbars 20, 20', 23, 24 and 22 also significantly aid the boom operator in visually gauging the distance of the outer end of the fuel boom from the fuel receptacle 12 by determining which milestone crossbar the end of the fuel boom is nearest as the end of the fuel boom approaches the fuel receptacle 12.

It is to be noted that milestone crossbar lines 20 and 20' extend past the ends of inner runway lines 16 and 16' and extend to the ends of outer runway lines 17 and 17', whereas milestone crossbar lines 23, 24, and 22 only extend to the inner converging runway lines 16 and 16'. However, because of a well established psychological aspect of vision called visual closure, milestone crossbar lines 23 and 24 will subconsciously be percieved as extending past inner converging runway lines 16 and 16' and extending to outer converging runway lines 17 and 17'. Milestone crossbar line 22, which does not present this type of closure effect, is a centralized visual line "buried" within the row of gradient density lines 26 and 26'. Line 22 serves two purposes: first, it is a central milestone point of visual perception and a visual gauge and aid for the boom operator as he initially maneuvers the fuel boom end into the fuel receiving receptacle 12; second, it "breaks up" the visual clutter effect which would occur if gradient density lines 26 and 26' were in a continuous row across the front of the fuel receiving receptacle 12.

Milestone crossbar lines 20, 20', 23, 24, and 22 are important visual aspects and are of a sufficient determined length so as to visually aid the boom operator in perceiving and gauging the depth and contour of the convex surface at each milestone crossbar location. Milestone crossbar lines 20 and 20' extend 155° around the circumference of the convex surface and thus, when viewed by the boom operator from a normal refueling position directly above and ahead of the receiving aircraft, the ends of the milestone crossbar lines 20 and 20' will recede almost entirely from the boom operator's view and thus give maximum perception of the convex surface at this location. Furthermore, the ends of milestone crossbar lines 20 and 20' provide a nominal starting point for the rearward extension of converging runway lines 16, 16', 17 and 17'. Milestone crossbar line 23 extends 82° around the circumference of the convex surface to the inner runway lines 16 and 16' at this location but, because of the closure effect previously described, is visually active and therefore perceptually extends for 124° around the circumference of the convex surface to the outer runway lines 17 and 17' at this location. Milestone crossbar line 24 extends 52° around the circumference of the convex surface to the inner runway lines 16 and 16' at this location but, because of the closure effect previously described, is visually active and therefore perceptually extends for 92° around the circumference of the convex surface to the outer runway lines 17 and 17' at this location. Milestone crossbar line 22 extends 22° between runway lines 16 and 16' and it is the width of the fuel receptacle 12.

The markings 10 also include comparator lines 25 and 25'. These lines aid in gauging the distance of the outer end of fuel boom 13 from the convex surface of the aircraft. The width between these comparator lines is predetermined to be slightly wider than the bulge of the end of the fuel boom. In this respect, when the boom operator initially looks down at the end of the fuel boom, it will appear wider than the spacing between lines 25 and 25'. As it gets closer to the pre-contact position, it will appear to fit within lines 25 and 25', at which point the tip of the fuel boom is very close to the surface of the receiver aircraft. This can be more fully understood from a comparison of FIGS. 5A and 5B. The bulge tip portion 12' of the fuel boom appears relatively large with respect to spaced lines 25 and 25' in FIG. 5A when it is relatively far from the surface of the aircraft, whereas it appears relatively small relative to lines 25 and 25' when it is relatively close to the surface of the aircraft, as shown in FIG. 5B.

The marking arrangement 10 also includes gradient density contour lines 26 and 26'. Lines 26 and 26' are relatively short inclined parallel lines located at the ends of lines 16, 17, 16' and 17', as shown. As can be seen from FIG. 2, lines 26 are inclined so that they are parallel to lines 16 and 17, and lines 26' are oppositely inclined so that they are parallel to lines 16' and 17'. Gradient density lines 26 and 26' extend 155° around the circumference of the convex surface at this location, such length presenting maximum perception of the contour and depth of the convex surface at this important location proximate to the fuel receiving receptacle 12. The row of gradient density lines serves to visually enhance contour definition due to the lines being equally spaced and identical, but perceptually changing in relative appearance as the observer's point of view changes. These gradient density lines are placed around the observable portion of the contour surface circumference such that they give a perspective effect of decreasing naturally in size and spacing as the surface contour recedes from the observer's view, and such that they present to the observer a contoured appearing cross sectional outline of the circumference at the location marked. Thus, the gradient density lines give the observer those optimal depth and perspective cues normally observed under ideal 3-D viewing conditions of light, surface context, and background relationships. Furthermore, the gradient density lines aid in aligning the fuel boom with the receiver aircraft. In this respect, FIG. 5 shows that when the receiver aircraft 11 is directly aligned with the tanker aircraft, lines 26 and 26' appear to the boom operator to symmetrically decrease in size and spacing as they recede equally down each respective side of the aircraft. However, FIG. 6 shows that when the tanker aircraft is to the left of the receiver aircraft 11, lines 26 will appear wider apart than lines 26', which are receding from view. If the tanker aircraft is to the right of the receiver aircraft as shown in FIG. 7, lines 26' will appear to be wider apart than lines 26, which are receding from view. The foregoing appearances are due to the fact that lines 26 and 26' are located on a convex surface that naturally presents a diminishing order of spacing and context as the contour surface recedes from the observer's view. While the gradient density contour lines have been shown as substantially parallel to the runway lines, it will be appreciated that they can be substantially parallel to the longitudinal axis of the aircraft body, or oriented in any other desired manner. Also the markings can be other than lines as long as they are of the same size and equally spaced.

The marking arrangement 10 also includes side marker lines 27 and 27' which are short slanted lines on each side of fuel receptacle 12. These visually aid in defining the exact location of the fuel receptacle 12 by visually presenting directional and location cues for the boom operator for control of the fuel boom towards fuel receptacle 12, and also aid in the visual aligning of the end of fuel boom 13 for contact within fuel receptacle 12 and final contact with the fuel valve 13' located at the aft end of the fuel receptacle.

The marking arrangement also includes a pair of aft horizontal contour lines 29 and 29' which are located immediately forward of the windshield or windscreen 30. The lines 29-29' can define the location of the windscreen 30 or other danger areas to aid in avoiding contact of windscreen 30 or other danger areas by the end of the fuel boom. In addition, lines 29 and 29' aid in defining the convex contour of the aircraft surface. These lines 29 and 29' can be of special colors and dimensions so as to visually present a warning or other danger signal of an area not to be encountered by the fuel boom, as described in greater detail hereafter.

The aft horizontal contour lines 29 and 29' extend 155° around the circumference of the convex surface at this location, such length presenting maximum perception of contour and depth of the convex surface at this location. At the ends of aft horizontal contour lines 29 and 29' are short lines 28 and 28' extending horizontally forward at right angles to the ends of lines 29 and 29'. The short lines 28 and 28' are known as "water lines" and visually delineate a known location to the boom operator and visually aid in recognizing when the receiving aircraft starts to move either to the right or left as either the right or left "water line" recedes from view. This visual aiding would not occur if aft horizontal lines 29 and 29' terminated without additional markings.

In accordance with the present invention the windscreen 30 or other areas can be outlined with a line 31 for two major reasons. The first is to give the boom operator the exact location of the windshield or other known danger areas to thereby aid in the prevention of accidental fuel boom contact therewith. The second purpose is to provide additional 3-dimensional emphasis to the contour of the aircraft.

Many aircraft may also include stabilizing vanes or cannards 32-32'. Vane 32 is outlined by lines 33, 34, 35, 36 and 37 and vane 32' is outlined by lines 33', 34', 35', 36' and 37'. The outlining of the stabilizing vanes or cannards serves several purposes. First, the outlining assists the boom operator's orientation relative to the receiver aircraft 11 and aids in providing a 3-dimensional display effect. In addition, because the lines outline the ends and inner width of the vanes, the boom operator is assisted in orienting the fuel boom relative to the receiver aircraft.

The marking system also includes outlining the eyebrow windows 39 and 39' or other areas with lines 40 and 40', respectively. In addition, eyebrow outline lines 41 and 41' aid in further defining the outer surface of the aircraft.

For a 50-foot viewing distance, all of the lines are preferably one inch wide, except outer runway lines 17-17' which are 1½ inches wide, comparator lines 25-25' which are ½ inch wide, and windscreen outline 31 which is ½ inch wide. Other dimensions can be utilized depending on the viewing distance and circumstances for viewing. In addition, all of the lines can be of various colors depending on the viewing circumstances and meaningfulness of the lines and colors. In the configuration shown in the accompanying figures, if the aircraft is totally dark gray, all lines can be silver color, except line 29 which is red signifying danger, and the lines 33-37 and 33'-37' and lines 41 and 41' which are yellow signifying special aircraft areas. Other configurations of colors can be used according to viewing tasks and circumstances.

A recommended material to mark lines on military aircraft for refueling and specialized operations is a unique narrow range reflected visibility material. This material is given as an example because of its unique characteristic of being visible only to an observer located within a few degrees of and proximate to the light source used to excite its reflective properties. Because of the high gain of this special reflector material, only a very minimal light source is required for sufficient visual reflectance for night mid-air refueling. In laboratory tests, a single cell AA flashlight excited a silver 1 inch×8 inch piece of this material sufficiently to be visible at 150 feet. The material which was tested is highly appropriate for specialized night and adverse lighting refueling conditions because of its almost non-detectable visibility from unwanted observers. The preferred retroreflective material is a metallized polycarbonate microprism sheeting known under the trademark REFLEXITE PC/1000® which is manufactured by the Reflexite Corporation. Other marking materials can also be used, such as paint, tape, active lights, electroluminescent strips, etc.

In FIGS. 9-15 a modified embodiment of the present invention is disclosed wherein the marking arrangement 10a is located aft of the windshield 30a of the aircraft 11a. The embodiment of FIGS. 9-15 is extremely similar in all respects to the embodiment of FIGS. 1-8 and accordingly corresponding markings will be designated with an a suffix without providing additional description. However, the embodiment of FIGS. 9-15 differs from the embodiment of FIGS. 1-8 in that it has two additional sets of gradient density contour markings 45a and 45'a which function in the same manner as gradient density contour lines 26a and 26'a. In addition, this embodiment includes a line 46a which is analogous in operation to line 29', and it also includes a line 46'a which is analogous to line 29. Line 46a is red to provide a warning that the outer tip of the boom should not extend forward of this line.

While the foregoing description has emphasized visual enhancement markings on a receiver aircraft, it will be appreciated that such markings may be applied to the tanker aircraft, to aid the pilot of the receiver aircraft is maneuvering relative to the tanker aircraft. It will also be appreciated that markings of the above described types may be applied to aircraft engaged in mid-air exercises other than refueling.

It can thus be seen that the marking arrangement of the present invention is manifestly capable of achieving the above enumerated objects and while preferred embodiments of the present invention have been disclosed, it will be appreciated that the present invention is not limited thereto but may be otherwise embodied within the scope of the following claims.

What is claimed is:

1. In a receiver aircraft having a convex body portion with a longitudinal axis and a fuel receiving receptacle on said convex body portion for receiving the outer end of a fuel boom of a tanker aircraft, a marking arrangement on said convex body portion for increasing visual perception of an observer in said tanker aircraft to facilitate this judgment of distance and for aiding in the alignment of said outer end of said fuel boom with said fuel receiving receptacle comprising converging elongated runway line means extending generally lengthwise of said longitudinal axis and converging toward said fuel receiving receptacle for aiding in the alignment and guidance of said outer end of said fuel boom toward said fuel receiving receptacle, and spaced elongated comparator line means centrally located between said elongated converging runway line means and extending lengthwise of said longitudinal axis and leading toward said fuel receiving receptacle for aiding in the judging of the distance of said outer end of said fuel boom from said convex body portion of said receiver aircraft.

2. In a receiver aircraft as set forth in claim 1 wherein said converging runway line means comprise a pair of inner converging runway lines, and a pair of outer converging runway lines spaced outside of said pair of inner converging runway lines.

3. In a receiver aircraft as set forth in claim 2 wherein each of said outer converging runway lines is substantially parallel to its associated inner converging runway line.

4. In a receiver aircraft as set forth in claim 1 wherein said spaced comparator line means comprise a pair of substantially parallel comparator lines.

5. In a receiver aircraft as set forth in claim 4 wherein said spaced comparator lines are substantially parallel apart an amount which is approximately the width of said fuel receiving receptacle.

6. In a receiver aircraft as set forth in claim 4 wherein said converging runway line means comprise a pair of inner converging runway lines, and a pair of outr converging runway lines spaced outside of said pair of inner converging runway lines.

7. In a receiver aircraft as set forth in claim 1 including milestone crossbar lines extending transversely to and between said converging runway line means.

8. In a receiver aircraft as set forth in claim 7 wherein said spaced comparator line means comprise a pair of substantially parallel comparator lines.

9. In a receiver aircraft as set forth in claim 7 wherein said converging runway line means comprise a pair of inner converging runway lines, and a pair of outer converging runway lines spaced outside of said pair of inner converging runway lines.

10. In a receiver aircraft as set forth in claim 9 wherein said spaced comparator line means comprise a pair of substantially parallel comparator lines.

11. In a receiver aircraft as set forth in claim 1 including gradient density contour line means extending circumferentially on said convex body portion in a line transverse to said longitudinal axis substantially at the location of said fuel receiving receptacle and on opposite sides thereof for visually enhancing contour definition to aid in the centering of said outer end of said fuel boom in alignment with said fuel receiving receptacle.

12. In a receiver aircraft as set forth in claim 11 wherein said gradient density contour lines comprise a plurality of relatively short lines spaced from each other with each line extending generally lengthwise of said longitudinal axis.

13. In a receiver aircraft as set forth in claim 12 wherein each of said relatively short lines has its longest dimension extending substantially in the direction of said converging runway line means.

14. In a receiver aircraft as set forth in claim 12 wherein said spaced comparator line means comprise a pair of substantially parallel comparator lines.

15. In a receiver aircraft as set forth in claim 14 including milestone crossbar lines extending transversely to and between said converging runway line means.

16. In a receiver aircraft as set forth in claim 1 wherein said receiver aircraft has a windshield on the opposite side of said fuel receiving receptacle from said converging runway line means, warning line means extending substantially perpendicularly to said longitudinal axis and located between said fuel receiving receptacle and said windshield.

17. In a receiver aircraft as set forth in claim 16 including outline means on said windshield for giving the exact location of the windshield and to provide additional three dimensional emphasis to the contour of the aircraft.

18. In a receiver aircraft as set forth in claim 1 wherein said receiver aircraft has stabilizing fins and outline means on said stabilizing fins.

19. In a receiver aircraft having a nose and a convex body portion with a longitudinal axis and a fuel receiving receptacle on said convex body portion for receiving the outer end of a fuel boom of a tanker aircraft, a marking arrangement on said convex body portion for aiding in the guiding of said outer end of fuel boom toward said fuel receiving receptacle and for aiding in the alignment of said outer end of said fuel boom with said fuel receiving receptacle comprising first elongated runway line means extending outwardly away from one side of said fuel receiving receptacle toward said nose of said aircraft and toward the closest outer side of said aircraft, said first elongated runway line means being skewed relative to said longitudinal axis, and second elongated runway line means extending outwardly away from the opposite side of said fuel receiving receptacle in symmetrical relationship to said first elongated runway line means about said longitudinal axis whereby said first and second elongated runway line means converge toward said fuel receiving receptacle to function in the nature of a visual funnel.

20. In a receiver aircraft as set forth in claim 19 including a pair of spaced elongated comparator line means extending forwardly from said fuel receiving receptacle toward said nose, said pair of spaced comparator line means being symmetrical about said longitudinal axis.

21. In a receiver aircraft as set forth in claim 19 including first gradient density contour line means extending toward one side of said receiver aircraft from one side of said fuel receiving receptacle in a direction transverse to said longitudinal axis, said first gradient density contour lines comprising a plurality of first substantially parallel lines each extending generally lengthwise of the aircraft, and second gradient density contour line means extending toward the opposite side of said receiver aircraft from the opposite side of said fuel receiving receptacle, said second gradient density contour lines comprising a plurality of second substantially parallel lines each extending generally lengthwise of the aircraft, said second gradient density contour line means being symmetrical to said first gradient density contour line means about said longitudinal axis, said first and second gradient density line means serving to visually enhance contour definition but perceptually changing in relative size and spacing as the point of view of an observer from a tanker aircraft changes.

22. In a receiver aircraft as set forth in claim 21 including a pair of elongated substantially parallel spaced comparator line means extending forwardly from said fuel receiving receptacle toward said nose, said pair of spaced comparator line means being symmetrical about said longitudinal axis.

23. In a receiver aircraft having a convex body portion with a longitudinal axis and a fuel receiving receptacle on said convex body portion for receiving the outer end of a fuel boom of a tanker aircraft, a marking arrangement on said convex body portion for increasing visual perception of an observer in said tanker aircraft for aiding in the alignment of said outer end of said fuel boom with said fuel receiving receptacle comprising converging elongated runway line means extending generally lengthwise of said longitudinal axis and converging toward said fuel receiving receptacle for aiding in the guidance of said outer end of said fuel boom toward said fuel receiving receptacle, and gradient density contour line means extending in a line transversely to said longitudinal axis substantially at the location of said fuel receiving receptacle and on opposite sides thereof for visually enhancing contour definition but perceptually changing in relative appearance as the point of view of an observer from a tanker aircraft changes for aiding in the centering of said outer end of said fuel boom in alignment with said fuel receiving receptacle, said gradient density contour line means comprising on each side of said receptacle a plurality of relatively short substantially parallel lines each extending generally lengthwise of the aircraft.

24. In a receiver aircraft having a convex body portion with a longitudinal axis and a fuel receiving receptacle on said convex body portion for receiving the outer end of a fuel boom of a tanker aircraft, a marking arrangement on said convex body portion for aiding in the alignment of said outer end of said fuel boom with said fuel receiving receptacle comprising converging runway line means converging toward said fuel receiving receptacle for aiding in the guidance of said outer end of said fuel boom toward said fuel receiving receptacle, said converging runway line means comprising elongated symmetrical lines on opposite sides of said fuel receiving receptacle and extending generally lengthwise of said longitudinally axis, and a plurality of milestone crossbar lines extending transversely to and between said converging runway line means with each of said crossbar lines being located a different distance from said fuel receiving receptacle.

25. In a receiver aircraft having a convex body portion with a longitudinal axis and stabilizing fins on said convex body portion and a fuel receiving receptacle on said convex body portion for receiving the outer end of a fuel boom of a tanker aircraft, a marking arrangement for aiding in the alignment of said outer end of said fuel boom with said fuel receiving receptacle comprising converging runway line means on said convex body portion converging toward said fuel receiving receptacle for aiding in the guidance of said outer end of said fuel boom toward said fuel receiving receptacle, said converging runway line means comprising elongated symmetrical lines on opposite sides of said fuel receiving receptacle and extending generally lengthwise of said longitudinally axis, and outline line means on said stabilizing fins for aiding in providing a three dimensional effect and for aiding in orienting said fuel boom relative to said receiver aircraft.

26. A marking arrangement for enhancing visual and depth perception of an aircraft having a body with a longitudinal axis comprising first elongated runway line means on said body skewed with respect to said longitudinal axis, second elongated runway line means symmetrical with said first runway line means about said longitudinal axis, said first and second elongated runway line means extending generally lengthwise of said longitudinal axis, said first and second gradient density contour line means symmetrical to said longitudinal axis and extending circumferentially on said body in a line substantially transverse to said longitudinal axis with each of said gradient density lines on each side of said longitudinal axis being a line extending in a direction generally lengthwise of said longitudinal axis, and with each of said gradient density lines on each side of said longitudinal axis being substantially parallel to each other and perceptually changing in relative size and spacing as the point of view of an observer from another aircraft changes.

27. A marking arrangement as set forth in claim 26 wherein said first gradient density contour line means comprise a plurality of first relatively short substantially identical lines spaced substantially equal distances from each other, and wherein said second gradient density contour line means comprise a plurality of second substantially identical relatively short lines spaced substantially equal distances from each other.

28. A marking arrangement as set forth in claim 27 wherein said first and second gradient density contour lines extend substantially parallel to said elongated first and second runway line means, respectively.

29. A marking arrangement as set forth in claim 28 wherein said first and second gradient density contour line means extend about said body at least about 155°.

30. A marking arrangement as set forth in claim 27 including third and fourth gradient density contour line means spaced along said longitudinal axis from said first and second gradient density contour line means, respectively, said third gradient density contour lines being substantially identical to each other and extending in substantially the same direction as said first gradient density contour lines, and said fourth gradient density contour lines being substantially identical to each other and extending in substantially the same direction as said second gradient density contour lines.

31. A marking arrangement as set forth in claim 26 including a plurality of substantially parallel milestone marker lines extending between said runway line means in a direction substantially perpendicular to said longitudinal axis and being spaced from each other along said longitudinal axis.

32. A marking arrangement as set forth in claim 31 wherein said milestone marker lines extend between about 22° and 155° about said body.

33. A marking arrangement for enhancing visual perception of a predetermined area on a convex aircraft body having a longitudinal axis comprising spaced substantially parallel comparator lines of selected separation determined by the appearance of a fuel boom in relation to said comparator lines and extending axially toward said predetermined area for visually gauging the proximity of the end of said fuel boom as it approaches the vicinity of said predetermined area, and a plurality of spaced substantially parallel milestone marker lines extending transversely to said spaced substantially parallel lines.

34. A marking arrangement as set forth in claim 33 wherein said milestone marker lines decrease in length as they approach said predetermined area.

35. A marking arrangement as set forth in claim 33 wherein said milestone marker lines are substantially perpendicular to said spaced substantially parallel lines.

36. A marking arrangement as set forth in claim 33 including gradient density contour lines on opposite sides of said substantially parallel lines on said convex aircraft body, said gradient density contour lines serving to visually enhance contour definition but perceptually changing in relative size and spacing as the point of view of an observer from a tanker aircraft changes and comprising a plurality of substantially equally spaced substantially parallel lines extending circumferentially on said aircraft body in a line transverse to said longitudinal axis with each of said equally spaced substantially parallel lines extending generally lengthwise of said longitudinal axis.

37. In a receiver aircraft as set forth in claim 5 wherein said outer end of said fuel boom includes a bulge having a first width and wherein said substantially parallel comparator lines are spaced apart a second width which is slightly larger than said first width.

38. In a receiver aircraft as set forth in claim 7 wherein said milestone crossbar lines comprise a plurality of substantially parallel lines each of which extends substantially perpendicular to said comparator lines and each of which is located a different distance from said fuel receiving receptacle.

39. In a receiver aircraft as set forth in claim 15 wherein said milestone crossbar lines comprise a plurality of substantially parallel lines each of which extends substantially perpendicular to said comparator lines and each of which is located a different distance from said fuel receiving receptacle.

40. In a receiver aircraft as set forth in claim 21 wherein said first and second gradient density contour line means each comprise a plurality of relatively short lines.

* * * * *